(12) United States Patent
Böhm et al.

(10) Patent No.: US 7,995,066 B2
(45) Date of Patent: Aug. 9, 2011

(54) METHOD OF DISPLAYING IMAGES

(75) Inventors: Stefan Böhm, Oberasbach (DE); Sandra Martin, Herzogenaurauch (DE)

(73) Assignee: Siemens Aktiengesellschaft, Munich (DE)

( * ) Notice: Subject to any disclaimer, the term of this patent is extended or adjusted under 35 U.S.C. 154(b) by 1031 days.

(21) Appl. No.: 11/230,803

(22) Filed: Sep. 20, 2005

(65) Prior Publication Data

US 2006/0098006 A1    May 11, 2006

(30) Foreign Application Priority Data

Sep. 24, 2004  (DE) .......................... 10 2004 046 441

(51) Int. Cl.
*G06T 13/00* (2011.01)
*G06K 9/00* (2006.01)
*G06T 15/00* (2006.01)

(52) U.S. Cl. .......................... 345/475; 345/419; 382/131

(58) Field of Classification Search .................. 345/475; 382/131

See application file for complete search history.

(56) References Cited

U.S. PATENT DOCUMENTS

| | | | |
|---|---|---|---|
| 4,771,342 A | | 9/1988 | Beesley |
| 5,119,409 A | * | 6/1992 | Nields et al. .................. 378/106 |
| 5,224,141 A | * | 6/1993 | Yassa et al. .................. 378/98.2 |
| 5,301,220 A | * | 4/1994 | Wong .............................. 348/162 |
| 5,400,383 A | * | 3/1995 | Yassa et al. .................. 378/98.2 |
| 5,469,353 A | * | 11/1995 | Pinsky et al. ................. 382/131 |
| 5,594,849 A | * | 1/1997 | Kuc et al. ....................... 345/632 |
| 5,600,700 A | * | 2/1997 | Krug et al. ...................... 378/57 |
| 5,736,857 A | * | 4/1998 | Taft .............................. 324/309 |
| 5,740,801 A | * | 4/1998 | Branson ......................... 600/407 |
| 5,764,212 A | * | 6/1998 | Nishitani et al. ................. 345/98 |
| 5,774,357 A | * | 6/1998 | Hoffberg et al. .............. 713/600 |
| 5,793,166 A | * | 8/1998 | Vis et al. ........................ 315/383 |
| 5,832,055 A | * | 11/1998 | Dewaele .......................... 378/62 |
| 5,877,819 A | * | 3/1999 | Branson ......................... 348/701 |
| 5,901,246 A | * | 5/1999 | Hoffberg et al. .............. 382/209 |
| 5,929,827 A | * | 7/1999 | Isono et al. ................... 345/74.1 |
| 6,054,980 A | * | 4/2000 | Eglit ............................. 345/204 |

(Continued)

FOREIGN PATENT DOCUMENTS

EP    0 674 426 B1    9/1995

(Continued)

OTHER PUBLICATIONS

Tianfang Li; et al.,"Nonlinear sinogram smoothing for low-dose X-ray CT", IEEE Transactions on Nuclear Science, vol. 51, Issue 5, Part 2, Oct. 2004, pp. 2505-2513.*

(Continued)

*Primary Examiner* — Ulka Chauhan
*Assistant Examiner* — Roberta Prendergast

(57) ABSTRACT

The present invention relates to a method for image reproduction, in particular for single or serial medical exposures, whereby one or more main images are reproduced on a display device. The method is characterized in that additional or interim images are generated using image interpolation prior to image reproduction from the one or more main images and in that additional image noise which varies from image to image is applied to the one or more main images and the additional or interim images, said image noise being generated by a noise generator, and image reproduction taking place by displaying in chronological order the one or more main images and additional or interim images to which the additional image noise has been applied. The method in particular improves the visual image impression in the case of fluoroscopic X-ray image exposures, without having to increase the applied X-ray dose.

9 Claims, 1 Drawing Sheet

U.S. PATENT DOCUMENTS

| | | | | |
|---|---|---|---|---|
| 6,256,403 B1* | 7/2001 | Florent et al. | | 382/128 |
| 6,392,652 B1* | 5/2002 | Cronin et al. | | 345/473 |
| 6,486,882 B1* | 11/2002 | Wolverton et al. | | 345/475 |
| 6,592,523 B2* | 7/2003 | Avinash et al. | | 600/443 |
| 6,709,393 B2* | 3/2004 | Ogawa | | 600/443 |
| 6,738,054 B1* | 5/2004 | Yamaguchi | | 345/204 |
| 6,747,660 B1* | 6/2004 | Olano et al. | | 345/582 |
| 6,816,564 B2* | 11/2004 | Charles et al. | | 378/5 |
| 6,829,323 B2* | 12/2004 | Toth et al. | | 378/4 |
| 7,031,423 B2* | 4/2006 | Tsukagoshi | | 378/4 |
| 7,120,283 B2* | 10/2006 | Thieret et al. | | 382/131 |
| 2002/0057757 A1* | 5/2002 | Khoury | | 378/21 |
| 2003/0187355 A1* | 10/2003 | Ogawa | | 600/437 |
| 2003/0190066 A1* | 10/2003 | Boas et al. | | 382/131 |
| 2003/0206662 A1* | 11/2003 | Avinash et al. | | 382/254 |
| 2004/0008901 A1* | 1/2004 | Avinash | | 382/260 |
| 2004/0017880 A1* | 1/2004 | Toth et al. | | 378/4 |
| 2004/0174350 A1* | 9/2004 | Wang | | 345/204 |
| 2005/0019000 A1* | 1/2005 | Lim et al. | | 386/46 |

FOREIGN PATENT DOCUMENTS

WO  WO 2004/047021 A1  6/2004

OTHER PUBLICATIONS

Aach, T.; Kunz, D.; "Multiscale linear/median hybrid filters for noise reduction in low dose X-ray images", Proceedings., International Conference on Image Processing, vol. 2, Oct. 26-29, 1997, pp. 358-361 vol. 2.*

Chan, C.L.; Katsaggelos, A.K.; "Iterative maximum likelihood displacement field estimation in quantum-limited image sequences", IEEE Transactions on Image Processing, vol. 4, Issue 6, Jun. 1995, pp. 743-751.*

Flynn, M.J. et al., "Quantum noise in digital X-ray image detectors with optically coupled scintillators", IEEE Transactions on Nuclear Science, vol. 43, Issue 4, Part 1, Aug. 1996, pp. 2320-2325.*

Glenn, W.H., "Noise in interferometric optical systems: an optical Nyquist theorem", IEEE Journal of Quantum Electronics, vol. 25, Issue 6, Jun. 1989, pp. 1218-1224.*

Soares, E.J. et al., "Noise characterization of combined Bellini-type attenuation correction and frequency-distance principle restoration filtering [SPECT]", Transactions on Nuclear Science, vol. 43, Issue 6, Part 2, Dec. 1996, pp. 3278-3290.*

Maeda, J.; Fukuchi, Y.; Kogoshi, S.; "Quantum noise analysis of frequency-doubling ring lasers: nonlinearity-induced noise enhancement and its dependence on gain profile", IEEE Journal of Quantum Electronics, vol. 34, Issue 11, Nov. 1998, pp. 2172-2178.*

Oliver, B.M.; "Thermal and quantum noise", Proceedings of the IEEE, vol. 53, Issue 5, May 1965, pp. 436-454.*

Machida, S.; Yamamoto, Y.; "Quantum-limited operation of balanced mixer homodyne and heterodyne receivers", IEEE Journal of Quantum Electronics, vol. 22, Issue 5, May 1986, pp. 617-624.*

* cited by examiner

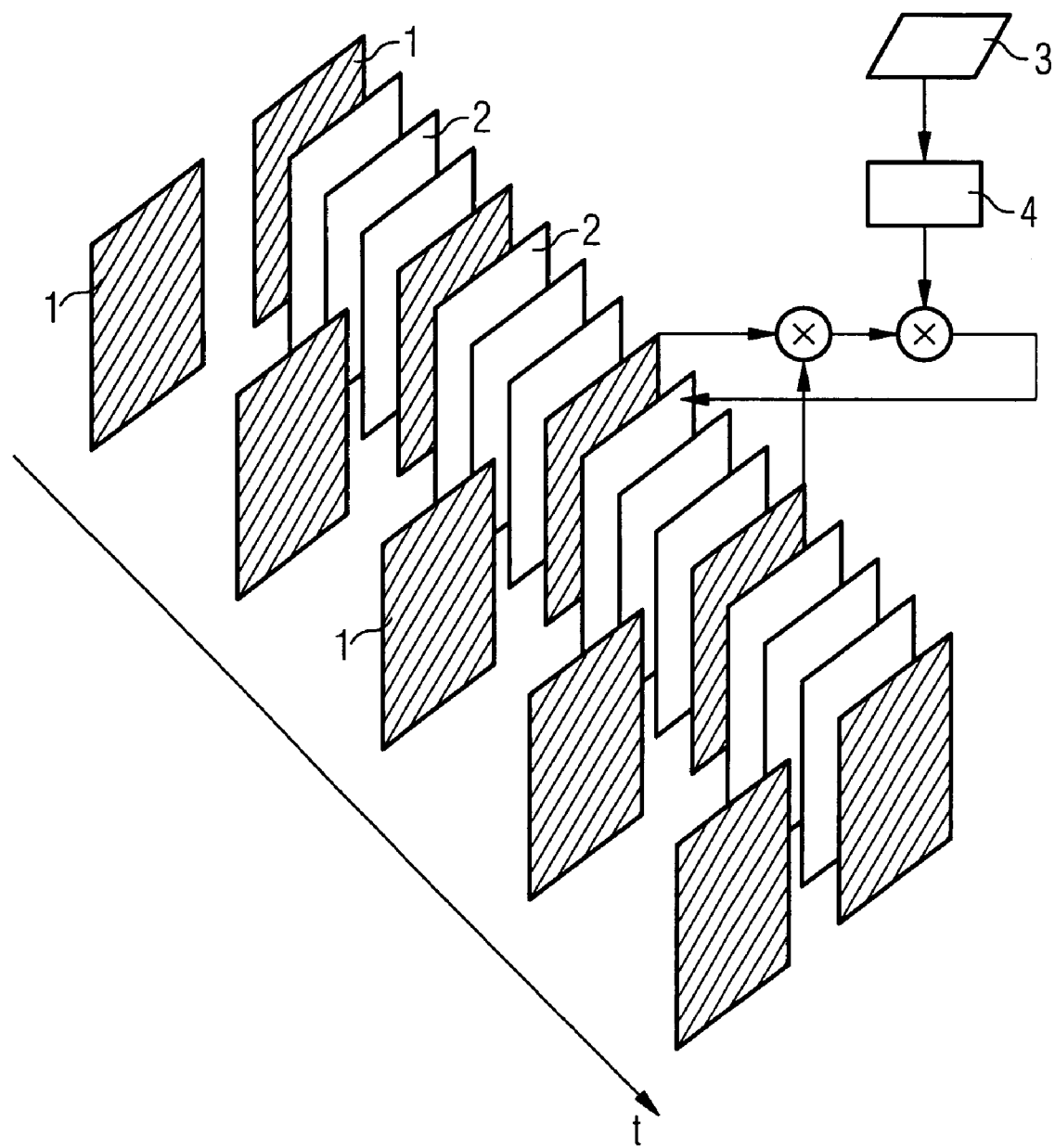

METHOD OF DISPLAYING IMAGES

CROSS REFERENCE TO RELATED APPLICATIONS

This application claims priority to the German application No. 10 2004 046 441.3, filed Sep. 24, 2004 which is incorporated by reference herein in its entirety.

FIELD OF INVENTION

The present invention relates to a method of reproducing images, in particular for single or serial medical exposures, in which one or more main images, in particular X-ray images, are reproduced on a display device.

BACKGROUND OF INVENTION

Primarily in interventions in which the doctor inserts medical instruments such as catheters into body channels, taking serial exposures by means of X-ray image technology plays a major role. During such an intervention a C-arm device is generally used to continuously take X-ray fluoroscopy images of the affected area of the body and these are displayed on a monitor. The doctor uses this display, in which the inserted instrument is identifiable in the corresponding environment, to navigate the instrument, in particular a guide wire or a catheter inside a blood vessel. The fluoro scopic X-ray images are taken with as small a dose of X-rays and as low an image acquisition frequency as possible, in order to minimize the patient's exposure to X-ray radiation. However, the small dose of X-rays means there is a very low signal-to-noise ratio, which severely limits the quality of the image. In particular, the background of the image frequently stands out because of undesired noise. The low image display frequency, which corresponds to the image acquisition frequency of generally only 7.5 or 15 Hz, has the additional consequence that the background noise appears as extremely coarse-grained.

U.S. Pat. No. 4,771,342 discloses a method for adjusting the quality of images from a video source to the quality of images acquired by means of an emulsion film, which includes a change in the image regeneration rate and the contrast ratio as well as a gamma correction.

European patent EP 0 674 426 B1 discloses a method for generating a digital semitone display of an original image, the display comprising a field of values of an output cell, representing the color content of pixels of the original image, and comprising the determination of cell values for consecutive output cells, for which cell values have not previously been determined. Also provided is a noise generator for the addition of a generated noise.

Unexamined application WO 2004/047021 A1 discloses a method for converting a first image into a second image, the second image having a higher image resolution after conversion than the first image, and noise being added to the second image.

SUMMARY OF INVENTION

An object of the present invention is to specify a method of reproducing images for single or serial medical exposures, with which a better image impression can be achieved when reproducing images. The method should in particular also be suitable for fluoroscopy exposures, without having to increase the X-ray dose for the patient.

The object is achieved by the claims. Advantageous embodiments of the method are the subject of the dependent claims or can be taken from the following description and from the exemplary embodiments.

In the present method for reproducing images, in particular in the case of single or serial medical exposures, one or more main images are reproduced in known fashion on a display device. In the case of serial medical exposures, in particular of X-ray images, the main images are taken here at a predetermined or predeterminable image acquisition frequency and are displayed during or after the performance of the serial exposures. The method is characterized in that additional or interim images are generated prior to the image reproduction from the one or more main images using image interpolation and image noise which varies from image to image is applied to the one or more main images and additional or interim images, said image noise being generated by a noise generator, and image reproduction takes place by displaying in chronological order the one or more main images and additional or interim images to which image noise has been applied. This results in a temporally high-frequency image noise during image reproduction, which significantly improves the visual impression. The image noise originally present in the images, particularly in the background to the images, is then less perceptible.

In the case of individual exposures, only a zero-order image interpolation takes place in the present method, i.e. a simple reproduction of the main image. However, by mixing or adding the additional noise which varies from image to image the additional images obtained through image interpolation differ from one another. The display of the images at a predeterminable image reproduction frequency then results in the high-frequency image noise and the improved image impression compared to a simple image regeneration at the image reproduction frequency.

In serial exposures, an image interpolation takes place, preferably higher than the zero order between consecutive main images in each case in order thereby to obtain additional interim images. Image reproduction then occurs by inserting the interim images into the image sequence at a higher image reproduction frequency compared to the image acquisition frequency.

By means of image interpolation used in the present method in conjunction with the overlaying of a preferably filtered image noise, known as noise shaping, the image reproduction frequency can be considerably increased for serial exposures, for example at an image acquisition frequency of 7.5 Hz to an image reproduction frequency of 60 Hz. The noise in the background of the image thereby becomes of a higher temporal frequency and thus produces a visually better impression. Thanks to noise shaping, i.e. adding to the image an additionally generated noise that varies from image to image, the noise originally present in the images is perceived less. For the observer this results in a considerably improved image impression, in which the image noise is no longer perceived as undesired, as is the case when using the present technology. The image exposure parameters, in particular the image acquisition frequency and in the case of X-ray images the X-ray dose, can then remain unaltered, so that in X-ray image technology in particular the radiation exposure for the patient can be kept low.

The method is particularly suitable in this connection for performing fluoroscopic X-ray exposures during an intervention, in which case the exposures are displayed as a navigation aid in real time on a screen.

BRIEF DESCRIPTION OF THE DRAWING

The FIGURE depicts the acquisition of fluoroscopic serial exposures and the subsequent generation and handling of interim images according to the invention.

DETAILED DESCRIPTION OF INVENTION

The present method is again explained briefly below on the basis of an exemplary embodiment in conjunction with the drawing. The exemplary embodiment relates to the performance of fluoroscopic serial exposures, but can easily be applied to other serial medical exposures, including those using other imaging techniques, such as ultrasound or magnetic resonance techniques. The FIGURE here shows the acquisition of main images 1 during a serial exposure. In the present example, three interim images 2 are generated from two consecutive main images 1 in each case by means of image interpolation, and are inserted between the main images 1 at equal intervals in time. Additionally, a noise generator 3 is used to generate extra image noise, which is added to the main and interim images 1, 2 following noise shaping 4. The image sequence with an image sequence frequency of 60 Hz thus obtained is then for example displayed at the image reproduction frequency of 60 Hz on a video monitor. Depending on the video standard or the facilities offered by the monitor graphics card combination used, the image reproduction frequency can of course also be higher.

The generation of the interim images 2 by image interpolation can optionally take place using nearest-neighbor interpolation (image regeneration), linear interpolation from the acquired main images 1 and spatial frequency filtering, for example low pass filtering. A synthetic noise image can be generated with a digital noise generator or, in particular when implementing the method into a graphics card, using analog means as well. The noise image is additionally preferably shaped using spatial frequency filters, optionally with low pass or high pass, and by setting the noise amplitude as a function of signal level (of the average pixel values) of the acquired main images. The latter corresponds to an emulation of the Poisson process of quantum noise.

Image interpolation in conjunction with noise shaping achieves a better display of serial medical exposures, in particular of X-ray images. The proposed method steps can also be implemented in an embodiment on a modern graphics card which can perform corresponding arithmetic operations.

The invention claimed is:

1. A method of displaying images in a chronological sequence, comprising:
    generating a plurality of interim images based on at least one main image using an image interpolation algorithm, said interpolation algorithm configured to generate a chronologically consecutive sequence of the interim images with respect to the at least one main image;
    adding a varying image noise to the main image and to the interim images, the image noise generated by a noise generator, wherein an amplitude of the image noise is adjusted based on a signal level of the main image, wherein said signal level is based on an emulation of quantum noise; and
    chronologically displaying the main image and the interim images in an image sequence, wherein the added varying image noise reduces a visual perception of noise in the displayed image sequence with respect to a noise originally present in the main image.

2. The method according to claim 1, wherein the main image includes a series of images.

3. The method according to claim 2, wherein
    the series of images includes a series of medical X-ray images acquired from a patient at an image acquisition frequency,
    the interim images are inserted into the series of X-ray images, and
    the series of X-ray images the interim images inserted into the series of X-ray images are displayed at an image display frequency higher than the image acquisition frequency.

4. The method according to claim 3, wherein each interim image is generated from two chronologically consecutive main images of the series of X-ray images using the image interpolation algorithm.

5. The method according to claim 3, wherein the image acquisition frequency is less or equal to 20 Hz, and the image display frequency is 60 Hz or higher to enable an image display frequency supportive of a corresponding high-frequency value for the added image noise, wherein said high-frequency value for the added image noise perceptibly improves a visual impression of the displayed images without having to increase a level of X-ray radiation exposure to the patient.

6. The method according to claim 1, wherein at least some of the interim images are generated from the at least one main image using spatial frequency filtering.

7. The method according to claim 6, wherein the spatial frequency filtering includes low pass filtering.

8. The method according to claim 1, wherein the image interpolation algorithm and the noise generator are integrated in a graphics card.

9. A graphics card for displaying a sequence of images, comprising:
    an interpolating unit having an image interpolation algorithm for generating a plurality of interim images based on at least one main image, said interpolation algorithm configured to generate a chronologically consecutive sequence of the interim images with respect to the at least one main image;
    a noise generator for adding image noise to the main image and the interim images, the image noise varying within the interim images, wherein an amplitude of the image noise is adjusted based on a signal level of the main image, wherein said signal level is based on an emulation of quantum noise; and
    a display coordination unit for chronologically displaying the main image and the interim images in an image sequence, wherein the added varying image noise by the noise generator reduces a visual perception of noise in the displayed image sequence with respect to a noise originally present in the main image.

* * * * *